United States Patent
Webster et al.

(10) Patent No.: US 9,132,575 B2
(45) Date of Patent: Sep. 15, 2015

(54) CARBURETOR FLOAT AND METHOD OF MANUFACTURING SAME

(71) Applicant: Hoffer Plastics Corporation, South Elgin, IL (US)

(72) Inventors: Charles Webster, Sugar Grove, IL (US); Keith Farthing, Elburn, IL (US)

(73) Assignee: Hoffer Plastics Corporation, South Elgin, IL (US)

( * ) Notice: Subject to any disclaimer, the term of this patent is extended or adjusted under 35 U.S.C. 154(b) by 148 days.

(21) Appl. No.: 13/679,099

(22) Filed: Nov. 16, 2012

(65) Prior Publication Data

US 2013/0154133 A1 Jun. 20, 2013

Related U.S. Application Data

(60) Provisional application No. 61/560,916, filed on Nov. 17, 2011.

(51) Int. Cl.
*F02M 5/12* (2006.01)
*B29C 44/04* (2006.01)
*F02M 5/16* (2006.01)
*B29C 44/58* (2006.01)

(52) U.S. Cl.
CPC ........... *B29C 44/0415* (2013.01); *B29C 44/586* (2013.01); *F02M 5/16* (2013.01)

(58) Field of Classification Search
CPC ..... C08L 23/0815; C08F 110/02; F02M 5/12; F02M 1/00; F02M 5/02
See application file for complete search history.

(56) References Cited

U.S. PATENT DOCUMENTS

| | | | | |
|---|---|---|---|---|
| 4,726,086 | A * | 2/1988 | McEvoy | 5/653 |
| 5,885,693 | A * | 3/1999 | Eder et al. | 428/160 |
| 7,334,278 | B2 * | 2/2008 | Yamasaki | 5/653 |
| 8,857,148 | B2 * | 10/2014 | Kemper et al. | 59/78.1 |
| 2002/0150718 | A1 * | 10/2002 | Bertoglio | 428/76 |
| 2005/0048276 | A1 * | 3/2005 | Wilson | 428/317.9 |
| 2008/0001315 | A1 * | 1/2008 | Shedd et al. | 261/121.3 |
| 2011/0099884 | A1 * | 5/2011 | Robinson | 43/43.14 |
| 2012/0085055 | A1 * | 4/2012 | Earl et al. | 52/309.1 |
| 2012/0241073 | A1 * | 9/2012 | Wiest et al. | 156/62.2 |

OTHER PUBLICATIONS

Trexel, Inc., MuCell Microcellular Foaming Solutions for Engineered Plastic Parts—Why MuCell, 2012.
Trexel, Inc., MuCell Microcellular Foaming Solutions for Engineered Plastic Parts—The Process, 2012.

* cited by examiner

*Primary Examiner* — Amber Orlando
(74) *Attorney, Agent, or Firm* — Knechtel, Demeur & Samlan

(57) ABSTRACT

A method of making a carburetor float by first creating a homogeneous mixture of gas and polymer in a plastic injection machine. The gas/polymer mixture is injected into a tool having a mold cavity. A moveable portion of the mold cavity allows the gas/polymer mixture to expand in that area thus forming a foamed portion of the finished float. The portion of the mold that is stationary does not allow the gas/polymer mixture to foam and thus forms a portion of the finished float with a higher density that the foamed portion. The result is a float made of the homogeneous mixture with two differing densities in two different portion of the float.

6 Claims, 3 Drawing Sheets

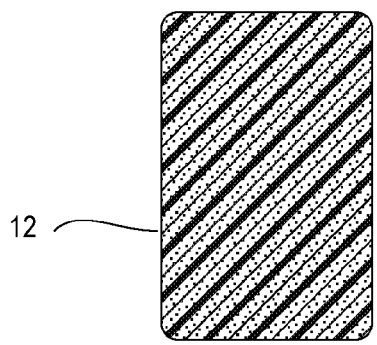
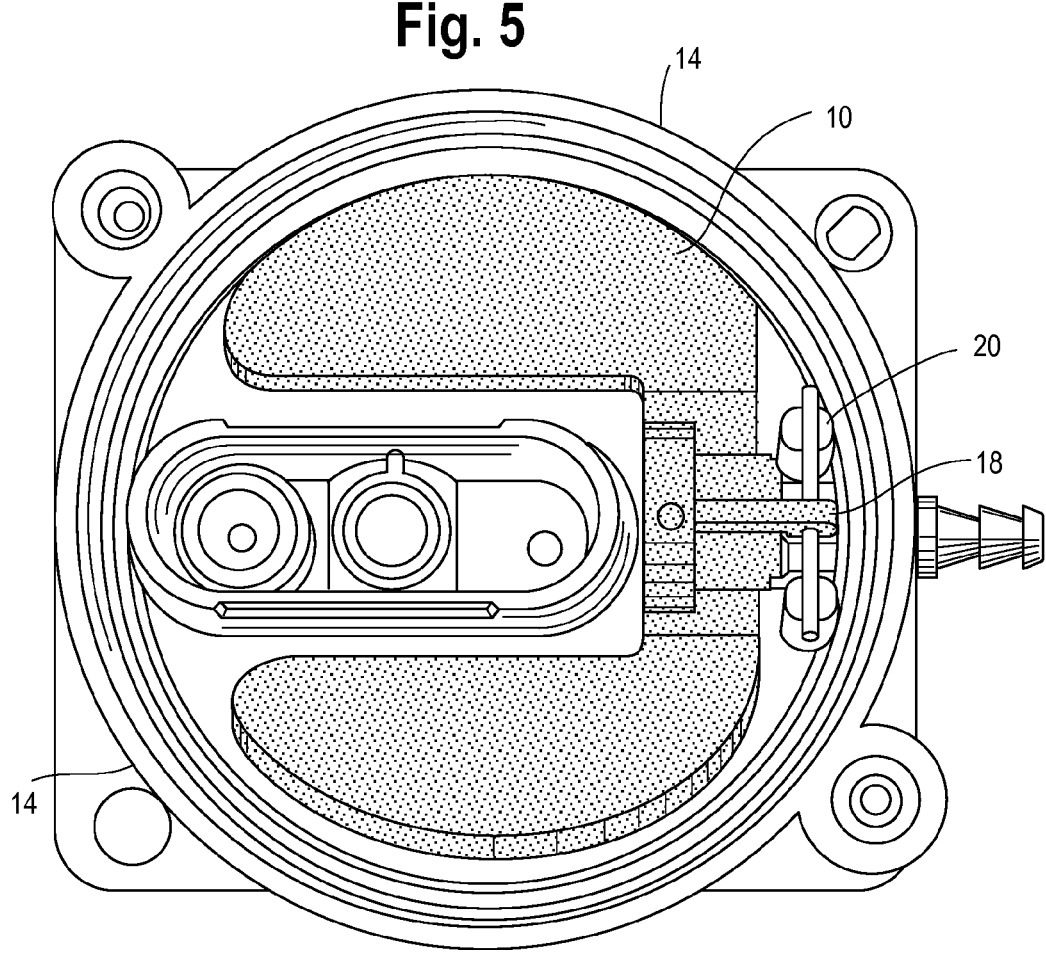

CARBURETOR FLOAT AND METHOD OF MANUFACTURING SAME

CROSS REFERENCE TO RELATED APPLICATION

This application is based on and claims priority of provisional patent application 61/560,916 filed Nov. 17, 2011.

BACKGROUND AND SUMMARY OF THE INVENTION

This invention relates to a method of manufacturing a foam molded product and more particularly a method of manufacturing a foam molded product that has at least two portions of varying densities. One specific application of this process is the manufacture of floats used in gasoline carburetors. The float is used to activate a valve or switch to allow gasoline to enter the carburetor. As the fuel in the carburetor bowl drops, the float also drops, and gasoline is allowed to enter the carburetor through a valve. As the float rises, it shuts off the flow of gasoline into the carburetor bowl.

The floats used in carburetors in the prior art are generally manufactured of a plastic material which was formed in two halves. The two halves have solid portions and other portions that form hollows so that when the two halves are placed face to face they form a float with a hollow interior. The solid portions form the hinge or other solid portions that are generally the hinge portions. The two halves are generally joined by sonically welding them to each other to create the finished float with the hollow interior and solid hinge portions. If the sonic weld or other joining means functions as intended, the seam where the two halves are joined is essentially fluid tight and free from leaks. The resultant float is intended to remain water tight, or in this case, gasoline tight and the float will remain floating in the carburetor bowl.

One problem with the prior art floats were that in the molding process that formed the two halves of the float, often times microscopic pinholes were present in the body of the float. Another problem was that the sonic welds may have not been perfect welds resulting in pinholes along the seam. If adhesives were used to join the two halves, the same problems could and did occur. This resulted in gasoline leaking into the body of the float which then caused the float to not operate properly as it became partially submerged in gasoline when it should have been floating on top of the gasoline. Another problem encountered was that depending on the material from which the float was made, the gasoline or other petrochemical substance could cause the float material to degrade which eventually caused the float to fail. This process of forming a float also required at least two steps, one to form each half and a second step in joining the two halves. Still another shortcoming of this process is that at times it required the additional step of trimming excess material from the finished product.

This invention utilizes a foam molding process used to mold polymeric materials. In the prior art, there has been used at least three different methods of foam molding of polymers. One method employs the method of injecting a gas into the tool or mold after the polymer has been injected into the tool or mold. This produces a product having a hollow center with a solid outer surface. The problem is that there is not uniformity or consistency in forming the hollow central portion and the surrounding area. Also it is not possible to form a finished product having two or more different densities that are controllable with uniformity. Throughout this application the term "tool" is meant to include both of the terms "tool" and "mold".

Another prior art molding process that uses foam molding uses an exothermic chemical reaction that mixes an agent into the polymer during the mixing process. The mixed product is injected into the tool and allowed to expand due to the chemical reaction. Again the extent and degree of the foaming is difficult to control and the production of a part having at least two different densities is difficult, if not impossible, to control.

In another method, a gas in mixed into the polymer in the screw heating portion of the injection machine where the polymer is being melted. This produces a homogeneous mixture of the gas and polymer. This method is utilized in Applicant's process.

Applicants' invention comprises a method of manufacturing a carburetor float made of a solid, one-piece, foamed part with at least two portions having different densities. In particular the carburetor float is made using a variation of a microcellular foam injection molding technology. One such process as owned and taught by Trexel, Inc. located in Wilmington, Mass., and called the MuCell Process, involves the controlled use of gas in its supercritical state mixed with a polymer that when injected into the tool and allowed to expand, creates a foamed part. The finished part has a closed cell structure so gasoline or other petrochemical products cannot penetrate the float in a sufficient number of microscopic points such that the float will not operate properly and fail. Rather, the finished float mimics a cork like structure having numerous cells. Thus, if even a relatively large number of the surface cells fail, the ability of the float to float in the petrochemical product is not substantially diminished.

The MuCell process is good for manufacturing a homogeneous part of uniform density as the introduction of the gas into the polymeric material causes a fairly uniform dispersion of the gas throughout the product resulting in uniform expansion of the polymer and is typically limited to approximately 8%-12% reduction in weight. Applicant's inventive process results in a product having structures of at least two different densities can be made in one tool through a unique manner of injecting the polymer and gas and controlling the movement as parts of the tool and results in greatly exceeding the current expansion of 8%-12%.

The Injection Molding Process

The injection molded process used involves the highly controlled use of gas in its supercritical state to create millions of micron-sized voids in the molded part. With the correct equipment configuration, tool design, and processing conditions, these microcellular voids are relatively uniform in size and distribution.

The voids are created or nucleated as a result of homogeneous nucleation that occurs when a single-phase solution of polymer and gas (commonly nitrogen gas, but occasionally carbon dioxide) passes through the injection gate into the tool.

By using the proper ratio of the foaming material and preferably nitrogen gas, the material expands or foams within the tool to create the finished product. Applicant's inventive process controls the movement of parts of the tool, thereby allowing the polymeric material to expand or foam in parts of the tool and restricts the expansion in other parts of the tool. This results in a molded part having varying densities in different locations. Thus, one can have a part with portions having a very low density such as in the float area, and other parts having a much higher density, such as in the hinge area. Obviously the hinge area of the carburetor must be much stronger and have a much higher density than the portion of the float that is designed to float in the gasoline. Applicant's process allows the float to have at least two different densities in different parts of the finished product, while accomplishing this in a singular injection molding operation. The end result is a one piece carburetor float made of a polymer that has a floating portion with a much lower specific gravity than from the material which is originally injected into the tool and another portion having a much higher specific gravity and inherent strength in another part of the finished piece. Furthermore, the process allows the finished product to assume very intricate shapes defined by the tool cavity. This results in a float that requires little finishing, if any. The result is a substantial reduction in the cost to manufacture the product. Furthermore, the number of defective products resulting from poor sonic welding or gluing as practiced in the prior art is eliminated. Yet another advantage is that the finished part uses much less polymer than the prior molding process resulting in lower cost of production.

The foam molding process is applicable to most resins ranging from polypropylenes to nylons, polybutylene terephthalates (PBT's) and other resins known to those skilled in the art. The resin is selected from those that have the characteristics that are suited for the end product. In this particular application, the resin is selected from those having gasoline and alcohol resistance.

BRIEF DESCRIPTION OF THE DRAWINGS

FIG. 4 is a cross sectional view taken along line 4-4 of FIG. 1.

FIG. 5 is a top plan view of the carburetor bowl with the inventive float installed and the hinge pin in place holding the float to the carburetor housing.

DESCRIPTION OF THE PREFERRED EMBODIMENT OF THE CARBURETOR FLOAT

Figure 1:
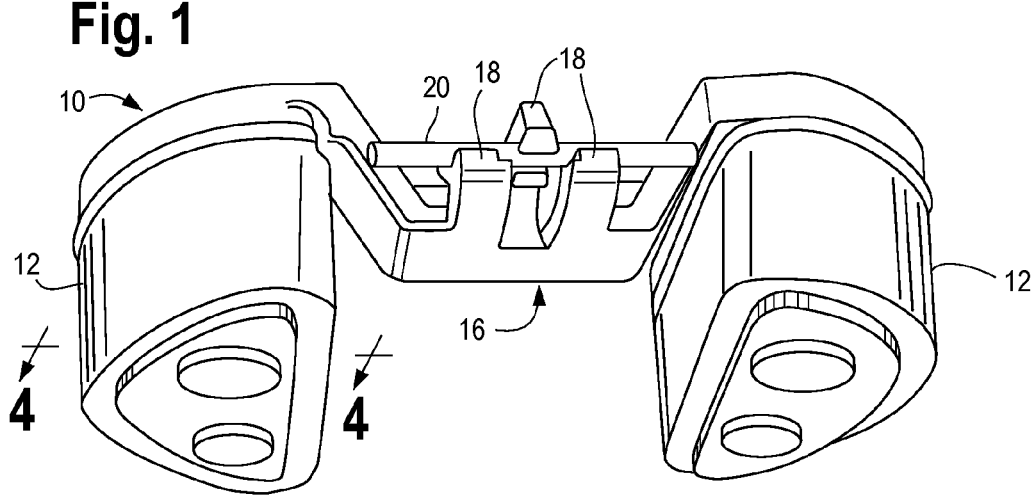
FIG. 1 is a perspective view of the inventive float as manufactured using the inventive process.

FIG. 1 illustrates a float 10 manufactured using the inventive process. The float 10 has a pair of opposite pontoon floats 12 that float in a carburetor bowl 14 (FIG. 5). The pontoon floats 12 are connected to each other by an arm 16. Projecting from the arm 16 are fingers 18 that receive a hinge pin 20 (shown in phantom) that attaches the float 10 to the carburetor bowl 14. This allows the float 10 to pivot about the pin 20 in response to the carburetor bowl 14 filling and emptying as gasoline is fed to the cylinder(s) of the engine from the carburetor. This operation is conventional in many small internal combustion engines.

The float is manufactured using applicant's inventive molding process based on the MuCell foam molding process as taught and disclosed in the MuCell technical information available from Trexel, Inc. but can be done with other methods of material expansion known to those skilled in the art of foam molding processes. The material from which the float 10 is manufactured is selected from one that is not affected by petroleum products or alcohol and does not deteriorate when set in a petroleum product such as gasoline. One example of a suitable material is Celcon® M90 Acetal (POM) Copolymer supplied by Ticona. Other copolymers and homo-polymers that suit the purpose for which the injection process is intended will be apparent to those skilled in the art.

The molding process produces a solid float as seen in the cross sectional view of FIG. 4. The foamed technology process results in a closed cell structure so that even if some of the cell walls fail, the overwhelming number of intact cells will still result in a float that functions as it is designed. Thus the problems of the prior art floats that are manufactured from two halves of the float being joined together, and in which the seal between the two halves fail, are eliminated. Also, should a leak in the wall of either of the two halves develop, the float will fail. Applicant's inventive float does not suffer from these shortcomings.

Applicant's process results in a foamed float that is impervious to gasoline, is light weight, uses less polymeric material than the prior art floats, requires less manufacturing time to make and requires less finishing steps.

In the molding process, it is apparent that it would be desirable if the entire float 10 could be made from one material and manufactured in one tool with a single injection of the polymer. The problem of prior foam molding processes is that they do not provide a method of manufacturing a foam molded product that has more than one density or specific gravity. For example, in applicant's float 10, it is necessary that the pontoon floats 12 are lighter than the fluid in which they are designed to float, which in this case is gasoline. At the same time, it is necessary that the arm 16 and fingers 18 are much stronger, with a higher density and specific gravity than the pontoon floats 12. The hinge formed by the hinge pin 20 and fingers 16 mating with the carburetor bowl 14 must be strong and resistant to wear so that they will last for the life of the carburetor.

Figure 6:
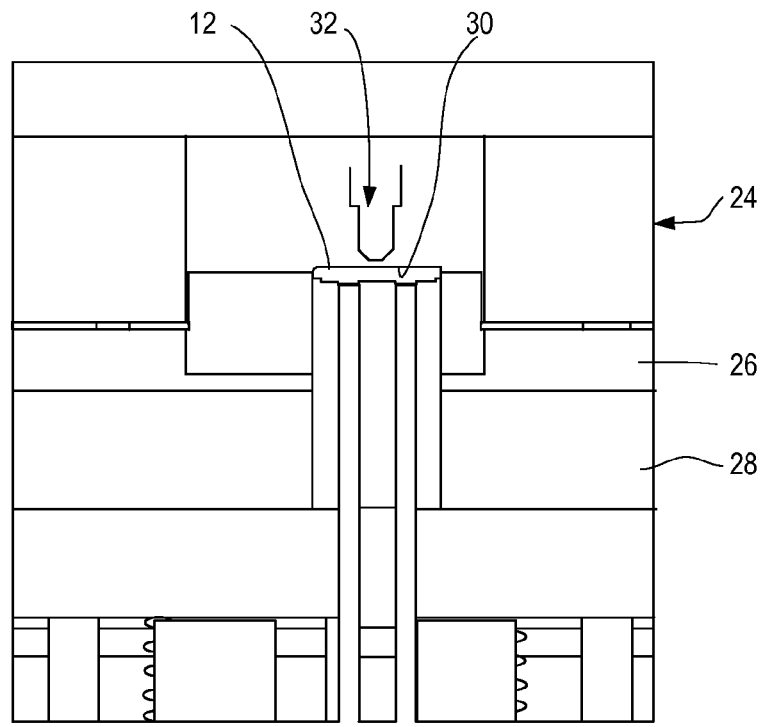
FIG. 6 is a schematic drawing of the tool before expansion.
Figure 7:
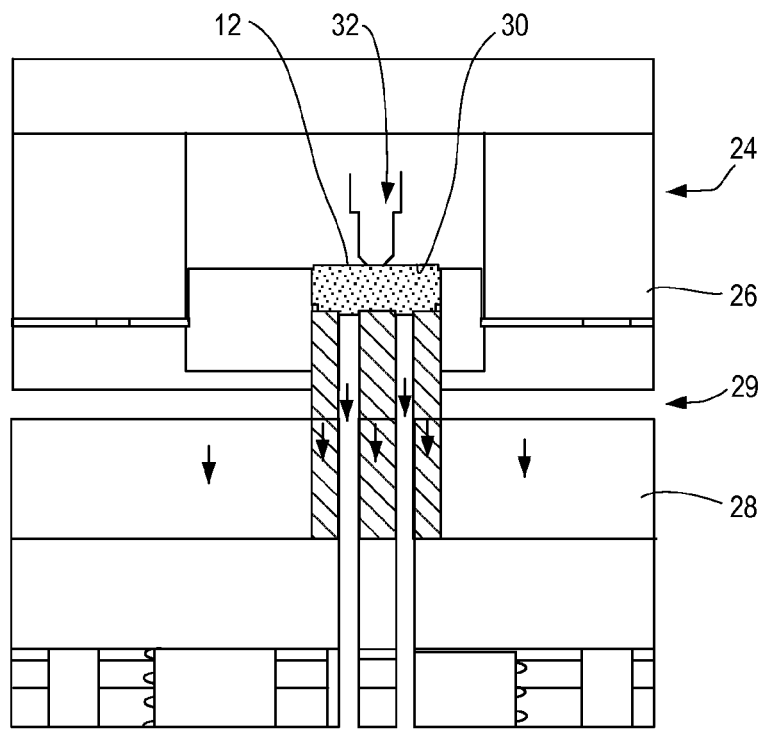
FIG. 7 is a schematic drawing of the tool after expansion.

The molding process is illustrated in the schematics of FIGS. 6 and 7. There is a tool 24 that has a top portion 26 and a bottom portion 28. Within the tool 24 is a mold cavity 30. An injection nozzle 32 receives the mixture of nitrogen gas and polymer that is blended in the traditional manner in a screw type injection molding machine. As previously described the polymer is selected from those polymers that meet the end requirements for the finished product. In Applicant's invention, the polymer is selected from those having gasoline, petrochemical and alcohol resistance. The nozzle 32 injects a predetermined amount of the molten mixture of the polymer and gas into the mold cavity 30.

Figure 2:
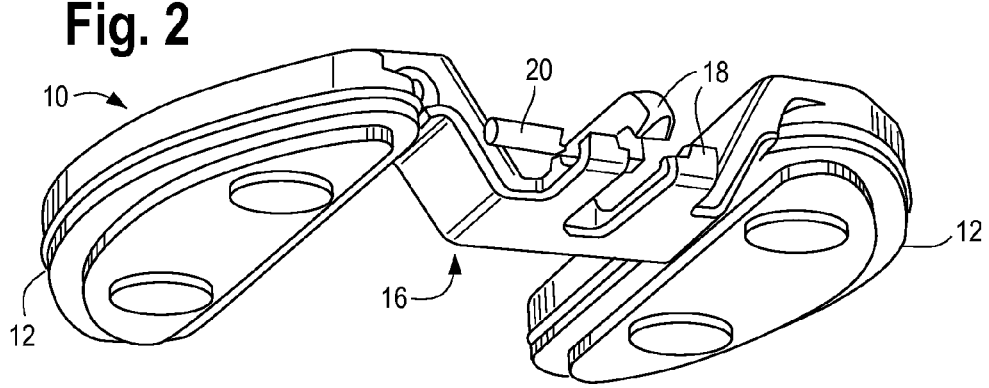
FIG. 2 is a perspective view of the inventive float in the tool prior to expansion of foaming.

As seen in FIG. 6, at this point in the molding process the float 10 looks like the shape of the piece as illustrated in FIG. 2. The arm 16 and fingers 18 appear to be the finished size. The pontoon floats 12 are flattened out rather than expanded. The top portion 26 and the bottom portion 28 of the tool are held adjacent to each other. This restrains any movement of the mold cavity 30 and restricts the foaming of the polymer. The pontoon float 12 as seen in FIG. 7 is flattened into the configuration as seen in FIG. 2

Figure 3:
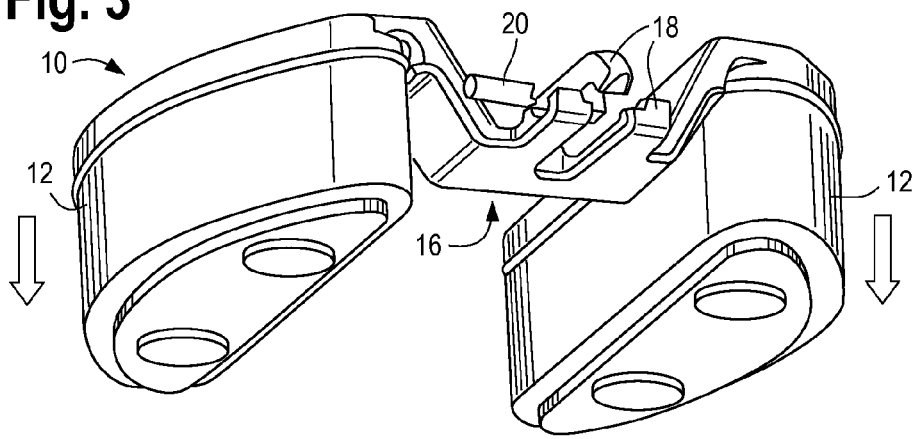
FIG. 3 is a perspective view of the inventive float in the tool after portions of the tool are expanded and after the float is foamed.

At this point in time in the injection molding process, the top portion 26 and bottom portion 28 are separated from each other a controlled amount leaving an air gap 29 between the two portions. The tool 24 assumes the position illustrated in FIG. 7. The portion of the mold cavity 30 forming the pontoon floats 12 has increased in size. Only the mold portion forming the pontoon floats 12 is allowed to increase in size. The portion of the mold forming the arm 16 and fingers 18 is held to the same size as originally configured. The result is that the polymer mixture foams in the area of the mold forming the pontoon floats 12, but the area of the mold forming the arm 16 and fingers 18 does not allow foaming. The pontoon floats 12 assume the shape of the piece as illustrated in FIG. 3. The arm 16 and fingers 18 are not allowed to expand and foam resulting in these parts being of high density resulting in a stronger part where strength is required yet allowing a foamed part in the pontoon float area. Thus the finished float 10 has at least two portions having two different densities or specific gravities. Yet the float 10 is manufactured with one shot of the polymer and gas mixtures.

The foaming process allows the polymer mixture to expand over 300% from the initial volume that was injected into the mold cavity 30. The process allows a weight reduction of the finished carburetor float of 67%-75%. Other weight reduction percentages are attainable dependent upon application, tool and molding parameters. The foamed or expanded portion forming the pontoon floats 12 has uniform and consistent cell distribution with millions of micron-sized voids or cells throughout the pontoon float 12. Yet the appearance of the float is that of a solid piece as seen in FIG. 4.

Thus there has been provided a carburetor float and method of manufacturing the same that fully satisfies the objects set forth above. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A carburetor float made by the process of:
   a. mixing a gas with a polymer in a screw conveyor;
   b. providing a tool with a mold cavity, the mold cavity having an internal configuration of the carburetor float and having at least one movable wall portion that is selectively moveable to increase a volume of the mold cavity in a predetermined section of the mold cavity and at least one fixed volume portion in the mold cavity;
   c. injecting a predetermined quantity of the gas/polymer mixture into the mold cavity;
   d. moving the at least one moveable wall portion to increase the volume of the mold cavity where the at least one moveable wall portion is located while maintaining the at least one fixed volume portion in its original configuration;
   e. expanding the gas/polymer mixture in a portion of the mold cavity where the at least one moveable wall portion is located so that the gas/polymer mixture fills an expanded portion of the mold cavity while the fixed volume portion is filled with the gas/polymer mixture in its originally injected state;
   f. creating the carburetor float having at least two different densities in two different portions of the carburetor float due to the expansion of the gas/polymer mixture in the expanded portion of the mold cavity while maintaining the fixed volume portion constant;
   g. cooling the gas/polymer mixture in the mold cavity;
   h. ejecting the carburetor float and wherein the carburetor float comprises a float portion and a hinge portion, the float portion having a first density and a hinge portion having a second density, the first density being less than the second density,
   the float portion and the hinge portion comprised of a singular homogeneous gas expanded polymer with a closed cell structure having the first density in the float portion providing buoyancy to cause the float portion to float in a liquid, and having the second density in the hinge portion for providing sufficient strength to support and retain a hinge pin without breaking the hinge portion when the hinge pin is inserted into the hinge portion and when the float portion repeatedly pivots about the hinge pin.

2. The carburetor float of claim 1 wherein the density of the ejected part formed in the fixed volume portion of the mold cavity is greater than the density of the part formed in the expanded portion of the mold cavity.

3. The carburetor float of claim 1 wherein the gas/polymer mixture is a single-phase solution.

4. The carburetor float of claim 1 wherein the gas is selected from the group comprising nitrogen and carbon dioxide.

5. The carburetor float of claim 1 wherein the polymer is selected from the group comprising polypropylenes, nylons and polybutylene terephthalates.

6. The carburetor float of claim 1 wherein the gas/polymer mixture expands over 200% in the expanded portion of the mold cavity.

* * * * *